US007036188B1

(12) United States Patent
Howie, Jr.

(10) Patent No.: US 7,036,188 B1
(45) Date of Patent: May 2, 2006

(54) COMPOSITE KNOB WITH LIGHT PIPE LEAKAGE BARRIER

(75) Inventor: Robert K. Howie, Jr., Decatur, IL (US)

(73) Assignee: The Grigoleit Company, Decatur, IL (US)

( * ) Notice: Subject to any disclaimer, the term of this patent is extended or adjusted under 35 U.S.C. 154(b) by 0 days.

(21) Appl. No.: 10/808,069

(22) Filed: Mar. 24, 2004

(51) Int. Cl.
*E05B 1/00* (2006.01)
*G01D 11/28* (2006.01)

(52) U.S. Cl. ........................................ 16/441; 362/26

(58) Field of Classification Search .................. 16/413, 16/414, 422, 433, 441, 118, 121, DIG. 30; 116/286, 309, DIG. 36; 362/26, 30, 551, 362/511, 489; 74/553, 548
See application file for complete search history.

(56) References Cited

U.S. PATENT DOCUMENTS 2,071,147 A 2/1937 Watson
2,185,492 A 1/1940 Barrett
2,193,586 A 3/1940 Fischett
2,425,611 A 8/1947 Frost et al.
2,565,803 A 8/1951 Danielson et al.
3,163,739 A 12/1964 Hutt
3,468,020 A 9/1969 Carlson et al.
3,514,366 A 5/1970 Allport
3,543,329 A 12/1970 Gulette et al.
3,549,733 A 12/1970 Caddell
3,619,594 A 11/1971 Morez
3,679,252 A 7/1972 Howie, Jr.
3,880,536 A 4/1975 Petrus
4,094,210 A 6/1978 Wirtz et al.
4,155,972 A 5/1979 Hauser et al.
4,165,659 A 8/1979 Fawley
4,179,771 A 12/1979 Rankins et al.
4,395,817 A 8/1983 Asada et al.
4,441,230 A 4/1984 Howie, Jr.
4,536,116 A 8/1985 Murray
4,603,065 A 7/1986 Mori et al.
4,751,038 A 6/1988 Schlueter et al.
4,760,752 A 8/1988 Wield et al.
4,923,325 A 5/1990 Howie, Jr.
5,040,479 A 8/1991 Thrash
5,050,269 A * 9/1991 Engstrom et al. ............. 16/433
5,093,764 A 3/1992 Hasegawa et al.

(Continued)

FOREIGN PATENT DOCUMENTS

DE 26 36 920 A 2/1978

(Continued)

*Primary Examiner*—Robert J. Sandy
*Assistant Examiner*—Andre' L. Jackson
(74) *Attorney, Agent, or Firm*—Cook,Alex,McFarron, Manzo,Cummings & Mehler, Ltd.

(57) ABSTRACT

A composite knob including an injection molded translucent core having a side wall and a top wall with light pipe window or a light pipe opening formed in these walls. A trim ring is positioned on the core and has an opening therethrough to align with the light pipe window or opening. A cover is mounted on the trim ring and core and includes an opening aligned with the trim ring opening and the light pipe window or opening. A light pipe located in the light pipe window or light pipe opening is visible through the trim ring and cover openings. An opaque plastic light transmitting barrier is formed between the light pipe window or light pipe and the openings in the trim ring and cover. The light transmitting barrier is molded as a part of a gripping overlay applied to the outer surface of the skirt of the knob.

12 Claims, 6 Drawing Sheets

U.S. PATENT DOCUMENTS

| | | | | |
|---|---|---|---|---|
| 5,095,409 | A | 3/1992 | Dematteo et al. | |
| 5,098,633 | A | 3/1992 | Hausler | |
| 5,159,892 | A | 11/1992 | Hara et al. | |
| 5,197,161 | A | 3/1993 | Howie, Jr. | |
| 5,252,798 | A | 10/1993 | Kamada | |
| 5,303,612 | A | 4/1994 | Odom et al. | |
| 5,359,165 | A | 10/1994 | Leveque et al. | |
| 5,376,314 | A | 12/1994 | Share et al. | |
| 5,407,721 | A | 4/1995 | Fujigaki et al. | |
| 5,450,653 | A | 9/1995 | Howie, Jr. | |
| 5,464,578 | A | 11/1995 | Salter et al. | |
| 5,469,758 | A | 11/1995 | Howie, Jr. | |
| 5,477,024 | A | 12/1995 | Share et al. | |
| 5,477,430 | A | 12/1995 | LaRose | |
| 5,512,718 | A | 4/1996 | Larose | |
| 5,514,319 | A | 5/1996 | Young | |
| 5,536,543 | A | 7/1996 | Papandreou | |
| 5,636,589 | A | 6/1997 | Kato et al. | |
| 5,641,556 | A | 6/1997 | Howie, Jr. | |
| 5,669,104 | A | 9/1997 | Howie, Jr. | |
| 5,688,461 | A | 11/1997 | Howie, Jr. | |
| 5,702,078 | A | 12/1997 | Shaw | |
| 5,752,759 | A | 5/1998 | Pizzo | |
| 5,811,175 | A | 9/1998 | Howie, Jr. | |
| 5,845,365 | A | 12/1998 | Howie, Jr. | |
| 6,003,206 | A | 12/1999 | Hall et al. | |
| 6,019,478 | A * | 2/2000 | Pizzo | 362/26 |
| 6,136,248 | A | 10/2000 | Howie, Jr. | |
| 6,338,561 | B1 * | 1/2002 | Ikarashi | 362/26 |
| 6,391,243 | B1 | 5/2002 | Howie, Jr. | |
| 6,428,174 | B1 * | 8/2002 | Snider | 362/27 |
| 6,499,191 | B1 | 12/2002 | Howie, Jr. | |
| 6,591,457 | B1 * | 7/2003 | Howie, Jr. | 16/441 |
| 6,652,128 | B1 * | 11/2003 | Misaras | 362/488 |
| 6,767,104 | B1 * | 7/2004 | Worrell | 362/26 |
| 6,860,224 | B1 * | 3/2005 | Snider | 116/310 |

FOREIGN PATENT DOCUMENTS

| | | | |
|---|---|---|---|
| EP | 0 498960 | A1 | 12/1991 |
| GB | 1561972 | | 3/1980 |
| GB | 2253898 | A | 9/1992 |
| GB | 2253996 | A | 9/1992 |

* cited by examiner

COMPOSITE KNOB WITH LIGHT PIPE LEAKAGE BARRIER

BACKGROUND AND SUMMARY OF THE INVENTION

This invention is directed to a light leakage barrier for a back lighted indicator of a control knob or button. The conventional back lighted indicator, or light pipe as it is commonly called, is flush with or projects beyond the surface of the core of the conventional injection molded control knob or button in which it is mounted either through an opening in the core wall or in a window housing such as a fin which is formed integrally with and projects beyond the core wall. The exposed sides of the back lighted indicator or the side walls of its fin, which are not intended to transmit light to a viewer, are obscured by an opaque outer plastic covering. This molded, opaque outer covering overlies or abuts the edges of the light pipe indicator or the walls of its fin to provide a sharp cutoff and thus a high clarity definition for the back lighted indicator. When a back lighted indicator is provided in a knob which has a separately formed or assembled cover and/or a decorative trim ring, it has been difficult to prevent light leakage through the gaps which occur where the back lighted indicator projects through an opening in the cover or an opening in the decorative trim ring and this light leakage presents an irregular or ragged indicator to the viewer.

Therefore, an object of my invention is a light leakage barrier for the gaps which occur between a decorative trim ring, a cover and a light pipe indicator in a composite knob or button.

Another object of my invention is a light leakage barrier for a back lighted indicator which barrier is formed simultaneously with a gripping overlay applied to the skirt of a knob or the outer wall of a button.

A further object of my invention is a light barrier which is adaptable to both back lighted indicators which are flush with or project through openings in the core and to such indicators which are located in window housings such as fins which project beyond the outer surfaces of the core.

Other objects of the invention will be found in the following specification, claims and drawings.

DESCRIPTION OF THE PREFERRED EMBODIMENTS

Figure 1:
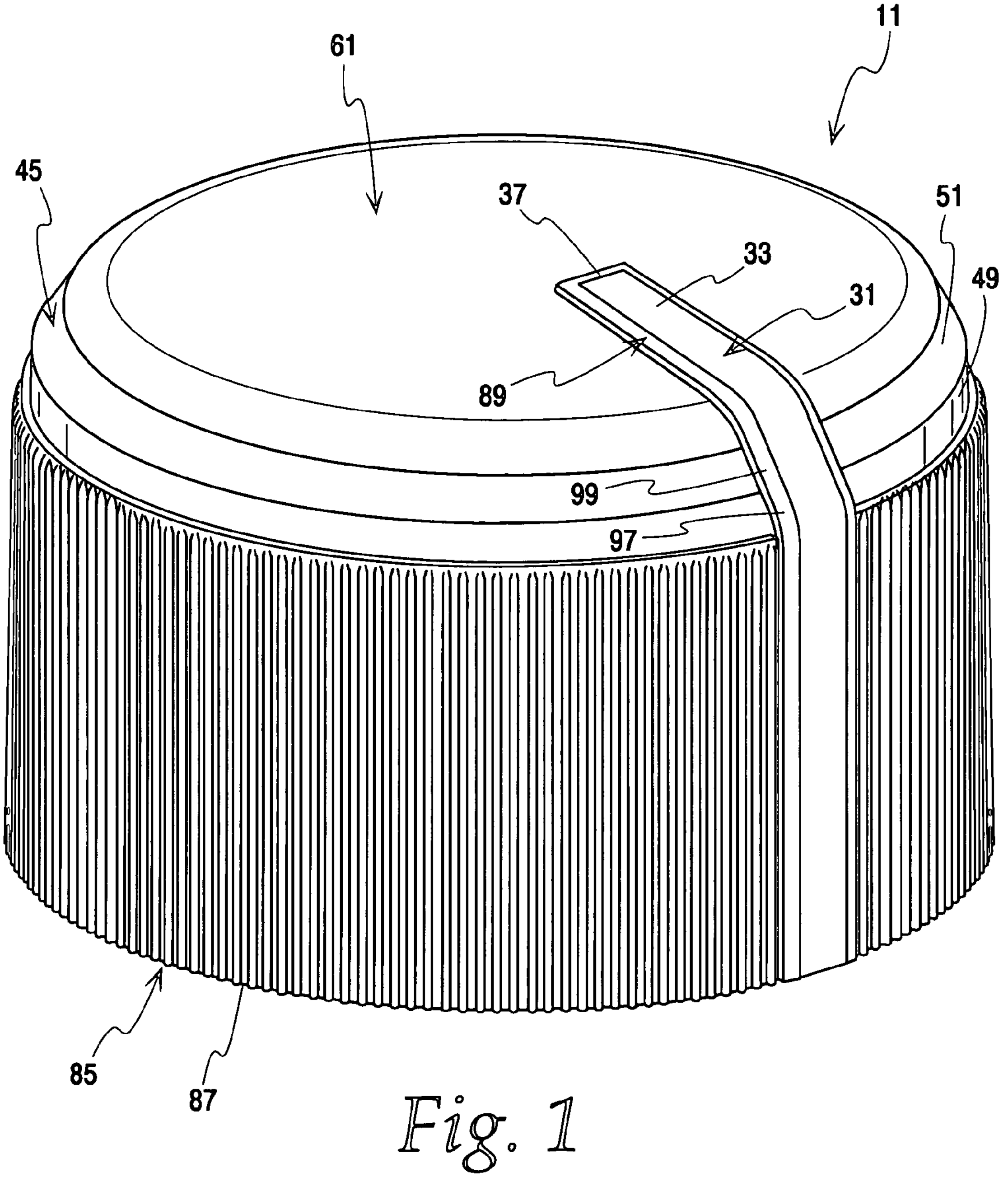
FIG. 1 is an enlarged, perspective view of a first embodiment of a composite knob incorporating the novel aspects of the invention.
Figure 2:
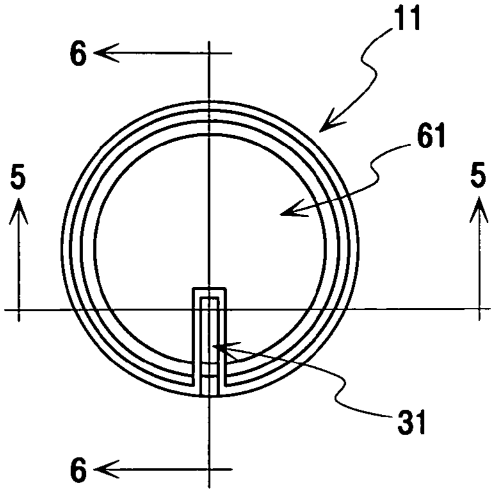
FIG. 2 is a top plan view of the knob of FIG. 1.
Figure 4:
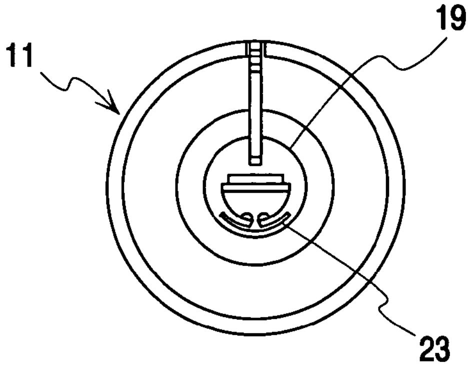
FIG. 4 is a bottom plan view of the knob of FIG. 1.
Figure 3:
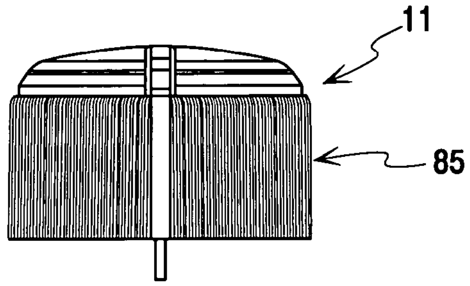
FIG. 3 is a side elevational view of the knob of FIG. 1.

FIGS. 1 through 7 of the drawings show a first embodiment of the invention in a composite knob or button 11. The knob includes a core 13 having integral skirt 15 and an end or top wall 17, a hub 19 extending from the top or end wall 17 and a socket 21 formed in the hub with gripping fingers 23 formed in the socket. The top or end wall 17 is formed with a sloping annular peripheral shoulder 25. The core may be molded of a white plastic such as an acetyl which is translucent, at least in thin layers.

A fin 31 is formed in the skirt 15 and end wall 17 of the core 13. The fin includes a rectangular web 33 which is supported by side walls 35 and an end wall 37. The web 33 is referred to as a window because in back lighted knobs, the core 13 is formed of a plastic that is translucent, at least in the thicknesses used for knobs and buttons, and the web is formed usually having a thickness less than that of the front wall 17 of the core and sufficiently thin to allow the passage of light.

A circular disk or trim ring 45 is formed of metal or a plated plastic and includes an end wall 47 and a rim 49 with an inclined wall 51 connecting the rim to the end wall. The rim 49 and inclined wall 51 may be provided with a decorative appearance or finish. A central opening 53 is formed in the end wall 47. A plurality of spaced holes 55 are formed in the disk. A radially extending passage 57 that connects the central opening 53 with the rim 49 of the end wall is also formed in the disk 45.

A domed cover 61 includes a down turned peripheral wall 63 and a centrally located tubular mount 65. The cover also includes mounting pins 67 which align with the holes 55 in the circular disk or trim ring 45. A radially extending passage 69 dimensioned to receive the fin 31 of the core 13 and a light barrier to be hereinafter described is formed in the cover. The cover 61 is aligned with the holes 55 in the trim ring 45 and the fin 31 and press fitted into engagement with the ring and core.

A light transmitting indicator 75, also referred to as a light pipe, is formed as a flat, irregularly shaped piece of plastic such as a polycarbonate. The light pipe includes an irregular edge 77 which engages the web 33 of the fin 31. The light pipe 75 also has side walls 79 which engage the interiors of the side walls 35 of the fin when the light pipe is inserted in the fin or the fin and core are molded over the light pipe.

An opaque outer skirt and core covering 85 is formed of an injection molded plastic such as black nylon with ribs 87 located on the exterior thereof for gripping purposes. The injection molded plastic of the opaque outer skirt and core covering 85 also forms a light barrier 89 having barrier side walls 91 and 93 (FIG. 5) and an end wall 95 (FIG. 6) which are dimensioned to engage and fit tightly against the side walls 35 and end wall 37 of the fin 31. The light barrier closes gaps 97 and 99 (FIG. 1), respectively, which exist where the radially extending passage 57 of the trim ring 45 extends through the rim 49 and inclined wall 51 and are located contiguous to the side walls 35 of the fin 31. The cover 61 terminates radially short of the inclined wall 51 and rim 49 of the trim ring 45 so it provides no concealing effect to these portions of the trim ring. The injection molded plastic forms a covering over the top or end wall 17 of the core which covering connects the opaque outer skirt covering 100 with the barrier side walls 91 and 93 and end wall 95. The core top wall covering is disk shaped with an annular groove 101 formed near the periphery of the disk and an annular ridge 103 located inwardly of the groove with the ridge surrounding a central circular depression 105 in the disk. The rim 49 of the trim ring 45 seats in the annular groove 101 to mount the trim ring on the core 13. The skirt and core covering 85, light barrier 89 and end wall covering 100 are formed in a single shot of opaque plastic.

Figure 6:
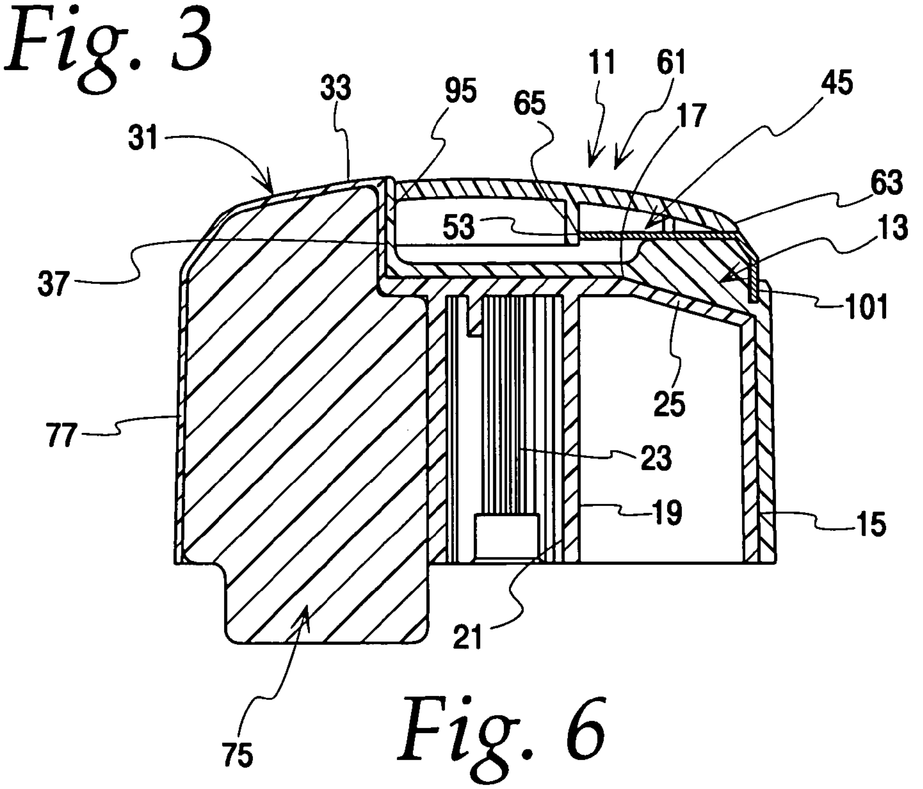
FIG. 6 is an enlarged, cross-sectional view taken along line 6—6 of FIG. 2.
Figure 5:
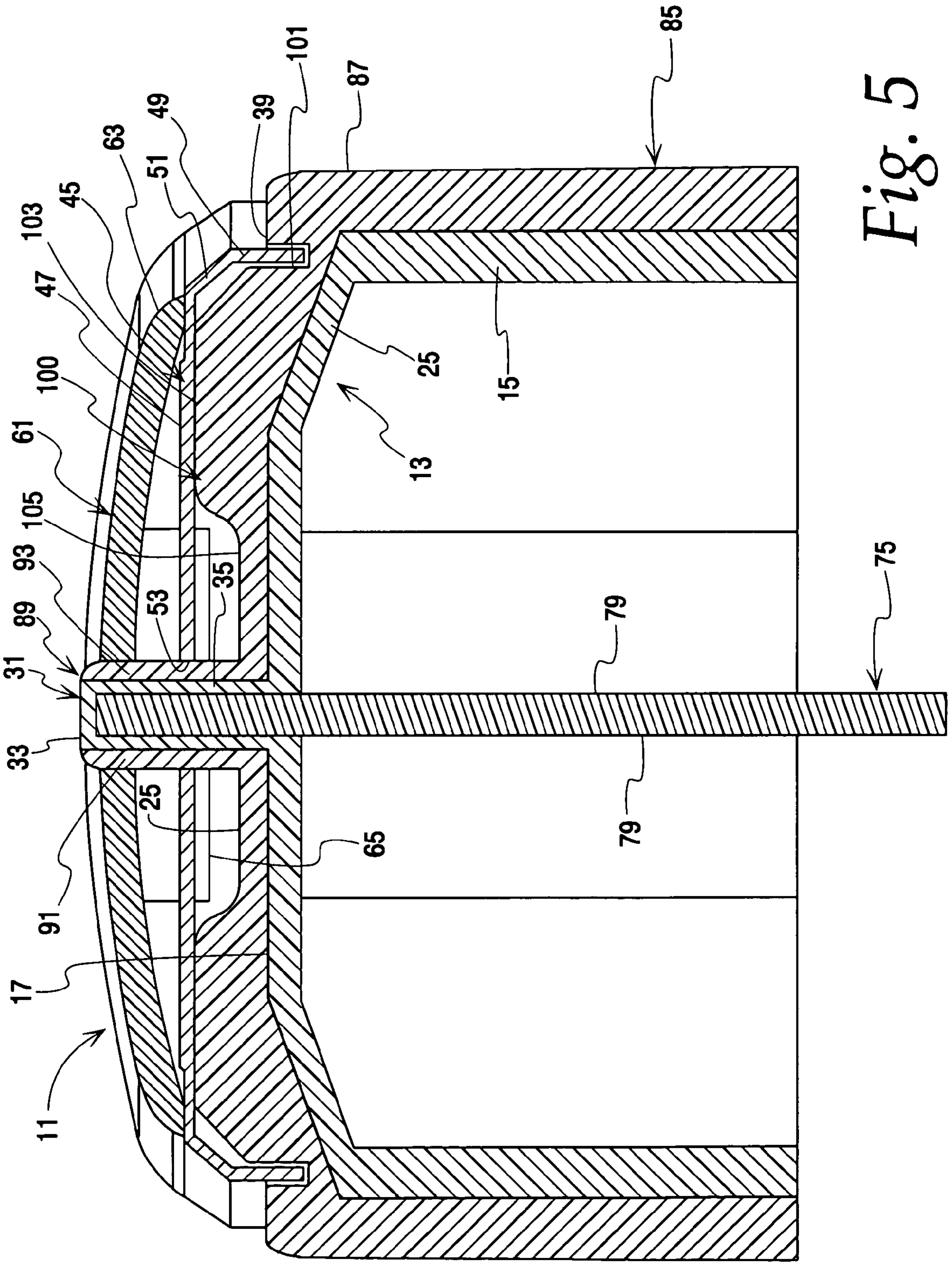
FIG. 5 is an enlarged, cross-sectional view taken along line 5—5 of FIG. 2.
Figure 7:
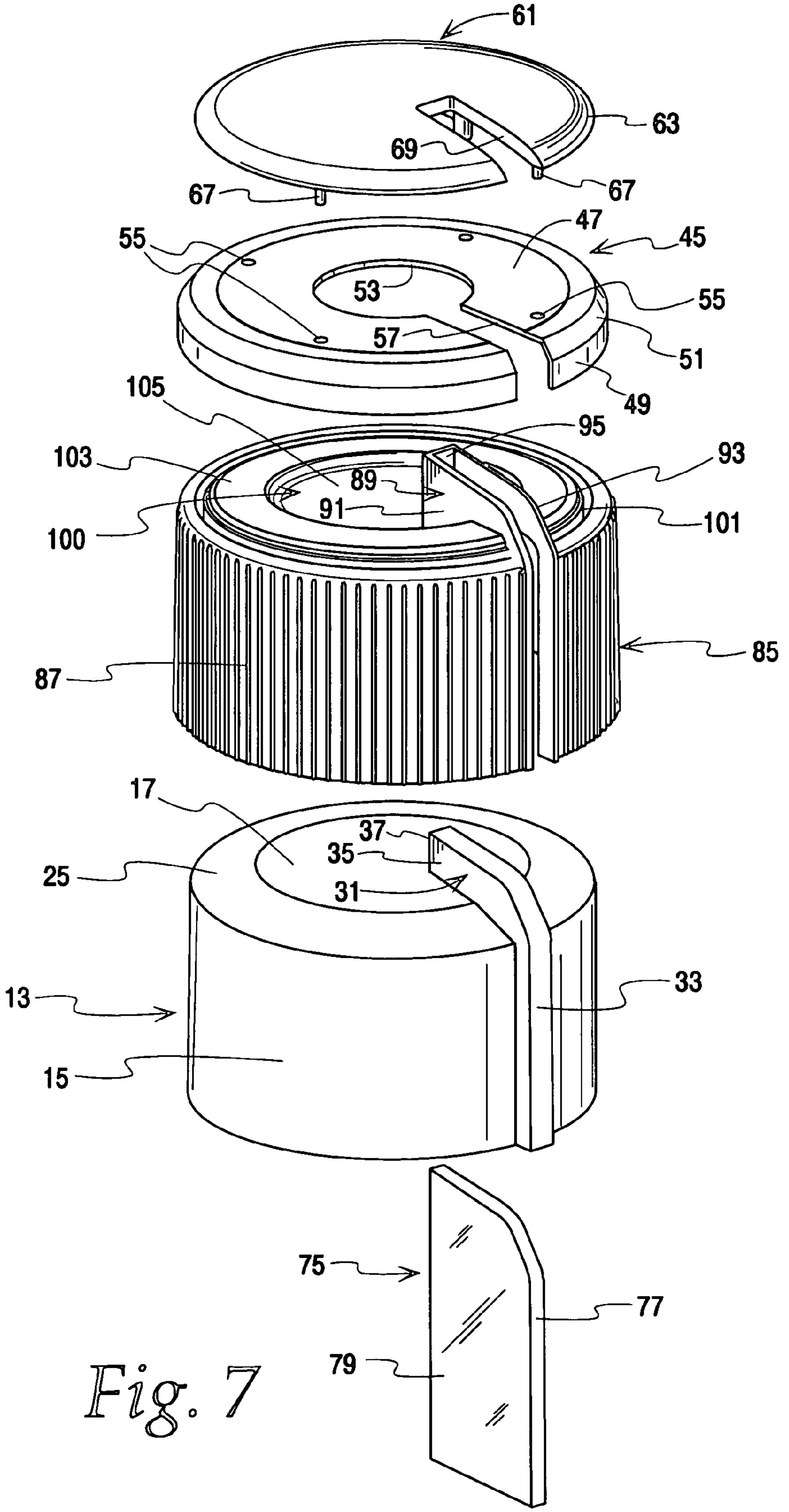
FIG. 7 is an exploded view of the knob of FIG. 1.
Figure 8:
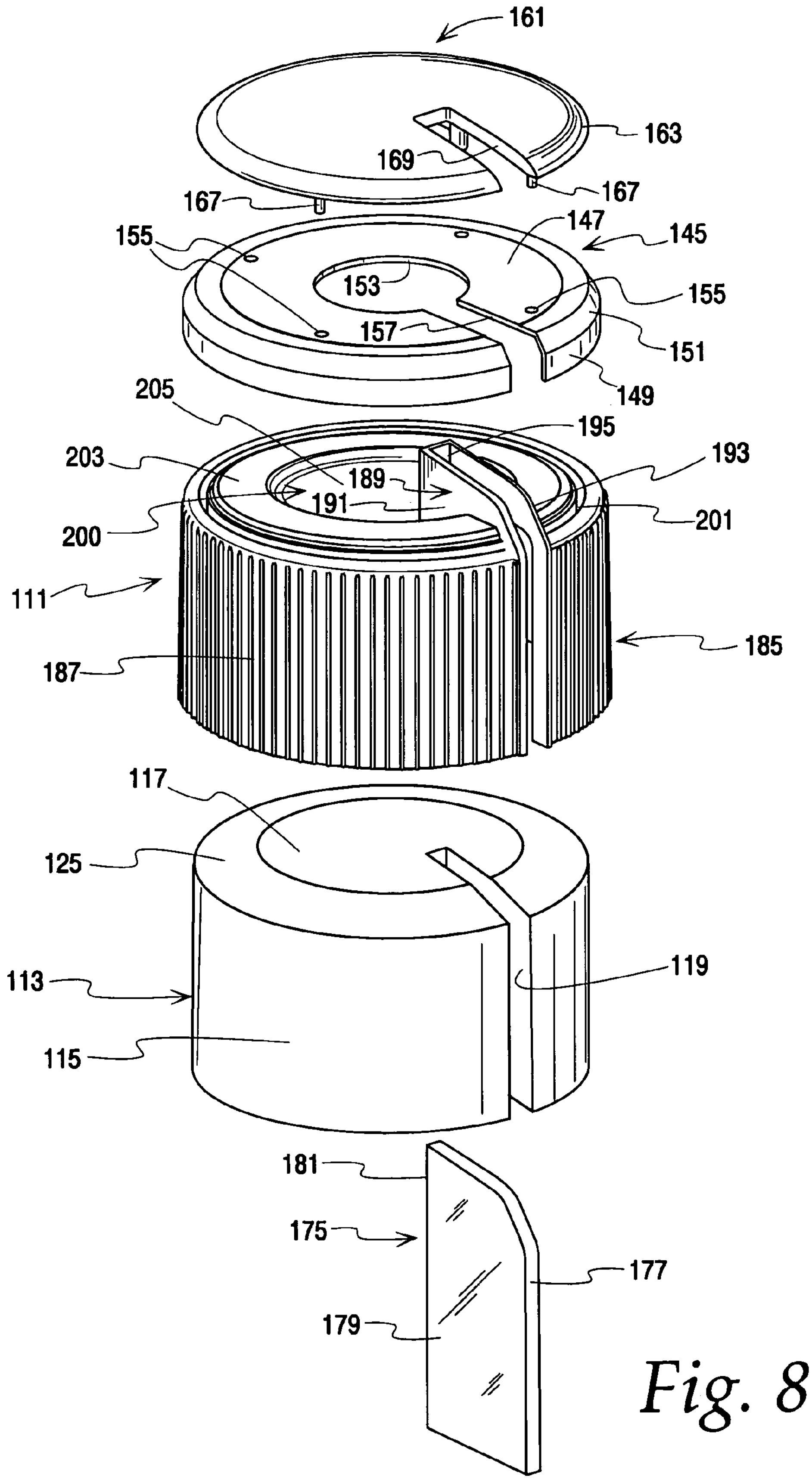
FIG. 8 is an exploded view of a second embodiment of a knob of this invention.

A second embodiment of a knob or button incorporating the novel aspects of the invention is shown in exploded view in FIG. 8 of the drawings. This modified knob or button 111 includes a core 113 having an integral skirt 115 and an end or top wall 117. A hub (not shown) extends from the underside of the top or end wall 117 and a socket (not shown) is formed in the hub with gripping fingers (not shown) formed in the socket essentially as shown in FIG. 6 of the drawings of the first embodiment of the invention. The top or end wall 117 is formed with a sloping annular peripheral shoulder 125. A passage 119 extends through the skirt 115 and the end wall 117 of the core 113. The passage 119 is sufficiently wide to receive a light transmitting indicator, to be hereinafter described, similar to the light transmitting indicator or light pipe 75 described in connection with the first embodiment of this invention. The core may be molded of a white plastic such as an acetyl which is translucent, at least in thin layers.

A circular disk or trim ring 145 is formed of metal or a plated plastic and includes an end wall 147 and a rim 149 with an inclined wall 151 connecting the rim to the end wall. The rim 149 and inclined wall 151 may be provided with a decorative appearance or finish. A central opening 153 is formed in the end wall 147. A plurality of spaced holes 155 are formed in the disk. Additionally, a radially extending passage 157 connects the central opening 153 of the disk with the rim 149 of the end wall.

A domed cover 161 includes a downturned peripheral wall 163 and a centrally located tubular mount which is not shown in the drawings but is similar to tubular mount 65. The cover also includes downwardly extending mounting pins 167 which align with the holes 155 in the circular disk or trim ring 145. A radially extending passage 169 dimensioned to receive a light transmitting indicator and its barrier walls is formed in the cover 161. The domed cover terminates radially short of the inclined wall 151 and rim 149 so it provides no concealing effect to these portions of the trim ring.

A light transmitting indicator 175, also referred to as a light pipe, is formed as a flat, irregularly shaped piece of plastic such as a polycarbonate. The light pipe includes an irregular edge 177 which extends into the radially extending passage 169 of the domed cover 161. The light pipe 175 also has side walls 179 and an end wall 181 that engage the walls of a light transmitting barrier to be hereinafter described which is installed in the passage 119 extending through the core 113. The edge 177 of the light pipe may be flush with the core 113 or may extend slightly outwardly thereof.

An opaque outer skirt and core covering 185 is formed of an injection molded plastic such as black nylon with exterior ribs 187 located on the exterior of the skirt covering for gripping purposes. The injection molded plastic of the opaque outer skirt and core covering 185 also forms a light barrier 189 having barrier side walls 191 and 193 and a barrier end wall 195 which are dimensioned to engage and fit tightly against the side walls 179 and end wall 181 of the light transmitting indicator 175 with the light barrier closing gaps which exist where the rim 149 and inclined wall 151 of the trim ring 145 and the similar passage 169 of the cover 161 are located contiguous to the side walls 179 and end wall 181 of the light transmitting indicator 175. The injection molded plastic forms a layer 200 over the top or end wall 117 of the core 113 which layer connects the opaque outer skirt layer with the barrier side walls 191 and 193 and end wall 195. The core top wall covering or layer 200 is disk shaped with an annular groove 201 formed near the periphery of the disk and an annular ridge 203 located inwardly of the groove with the ridge surrounding a central circular depression 205 in the disk. The rim 149 of the trim ring 145 seats in the annular groove 201 to mount the trim ring on the core 113. The skirt and core covering 185, light barrier 189 and end wall covering 200 are formed in a single shot of opaque plastic.

Figure 9:
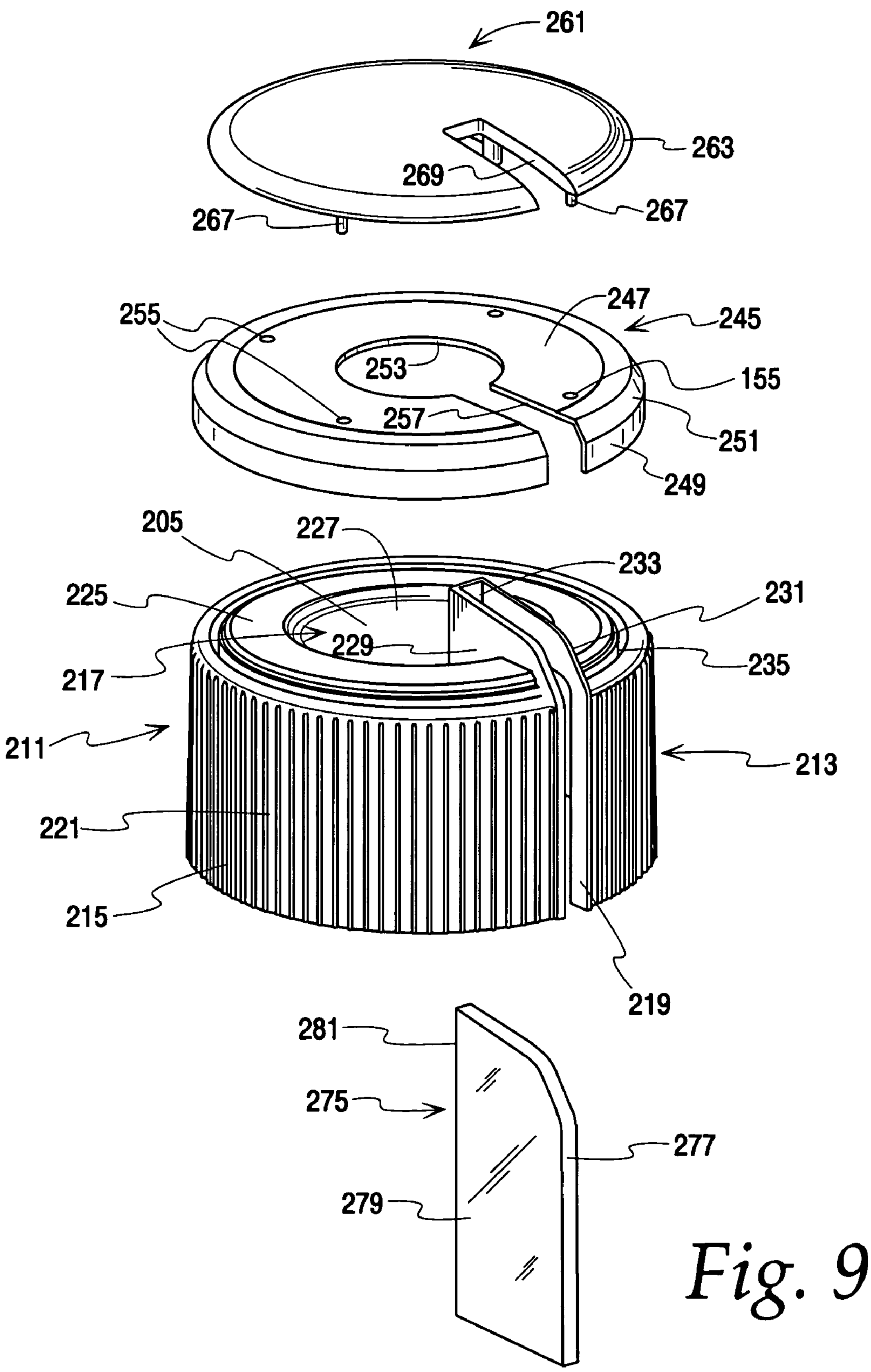
FIG. 9 is an exploded view of a third embodiment of a knob of this invention.

A third embodiment of a knob or button incorporating the novel aspects of the invention is shown in exploded view in FIG. 9 of the drawings. This modified knob or button 211 includes a core 213 having an integral skirt 215 and an end or top wall 217. A hub (not shown) extends from the underside of the top or end wall 217 and a socket (not shown) is formed in the hub with gripping fingers formed in the socket essentially as shown in FIG. 6 of the drawings of the first embodiment of the invention. The top or end wall 217 is formed with a sloping annular peripheral shoulder 225. A passage 219 extends through the skirt 215 and the end wall 217 of the core 213. The passage 219 is sufficiently wide to receive a light transmitting indicator, to be hereinafter described, similar to the light transmitting indicator or light pipe 75 described in connection with the first embodiment of the invention. Exterior ribs 221 are formed on the exterior of the skirt 215 for gripping purposes.

The core is molded of an opaque plastic such as black nylon. A light barrier 227 is molded integrally with the core 213. It includes barrier side walls 229 and 231 and barrier end wall 233 which extend longitudinally outwardly from said end or top wall 217 of the core 213. The barrier walls 229, 231 and 233 form an extension of the passage 219 which extends through the skirt 215 and end wall 217 of the core. The barrier side walls 229 and 231 may extend slightly radially outwardly of the exterior ribs 221 of the skirt 215. An annular groove 235 is formed near the periphery of the shoulder 225 of the top or end wall 217 of the core 213.

A circular disk or trim ring 245 is formed of metal or plated plastic and includes an end wall 247 and a rim 249 with an inclined wall 251 connecting the rim to the end wall. The rim 249 and the inclined wall 251 may be provided with a decorative appearance or finish. A central opening 253 is formed in the end wall 247. A plurality of spaced holes 255 are formed in the disk. Additionally, a radially extending passage 257 connects the central opening 253 of the disk with the rim 249 of the end wall. The rim 249 of the trim ring seats in the annular groove 235 to mount the trim ring on the core.

A domed cover 261 includes a downturned peripheral wall 263 and a centrally located tubular mount which is not shown in the drawings but is similar to tubular mount 65 of the first embodiment of the invention. The cover also includes downwardly extending mounting pins 267 which align with holes 255 in the circular disk or trim ring 245. A radially extending passage 269 dimensioned to receive a light transmitting indicator and its barrier walls 229, 231 and 233 is formed in the cover 261. The domed cover terminates radially short of the inclined wall 251 and rim 249 so it provides no concealing effect to these portions of the trim ring 245.

A light transmitting indicator 275, also referred to as a light pipe, is formed as a flat, irregular shaped piece of plastic such as a polycarbonate. The light pipe includes an irregular edge 277 which extends into the radially extending passage 269 of the domed cover 261. The light pipe has side walls 279 and an end wall 281 that engage the barrier walls 229, 231 and 233 of the light barrier 227.

The composite knobs or buttons of this invention can be manufactured using various techniques such as multi-shot molding, insert molding, or individual molding of the component parts with later assembly. For example, using the multi-shot molding process, the light pipe can be molded in a first shot and then the core can be over molded the light pipe, whether or not a light pipe housing such as a fin is provided, or if the light pipe just extends through a passage in the core as shown in the second embodiment of the invention. The ribbed opaque outer plastic that forms the opaque outer skirt gripping surface, core covering and light barrier can then be molded. In this type of molding technique, the light pipe may function as an anvil, if a fin with a thin window is provided in the core. The metal or plastic plated ring is then snapped into position on the composite knob and a cover is attached over to the core and the ring.

In the insert method of molding, the light pipe and core are molded separately and then assembled with the light pipe positioned in the core and supporting a window if one is used to function as an anvil. The outer gripping surface, core covering and light pipe barrier are then over molded with the light pipe functioning as an anvil supporting the window in a fin. A metal or plastic plated ring is placed on the knob made by the previous steps and a cover is then attached over the ring and core.

Another method of molding is to mold each element separately and then assemble the elements into a final composite knob or button. As previously mentioned, the ring may be metal or may be plastic that is plated or coated with metallic finishes or otherwise.

The invention claimed is:

1. A composite knob, comprising:

a core molded of an opaque plastic and having a skirt and an end wall, an indicator opening extending through said skirt and said end wall of said core, a light transmitting indicator positioned in said indicator opening and extending outwardly of said end wall of said core, a disk mounted on said core and having an opening therein to fit over and receive said outwardly extension of said light transmitting indicator, a cover mounted on said disk and said core and having an opening therein fitting over and receiving said outwardly extension of said light transmitting indicator, and an opaque plastic light transmitting barrier positioned between said outwardly extending extension of said light transmitting indicator and said openings in said disk and said cover with said barrier formed integrally with said core.

2. A composite knob, comprising:

an injection molded translucent core having a side wall and a top wall, an indicator window fin extending outwardly of said sidewall and said top wall of said core, said fin having an indicator window portion and side and end walls connecting said indicator window portion to said side wall and said top wall of said core, an opaque plastic light transmitting barrier located against said side and said end walls of said fin, a trim ring mounted over said core and having a fin receiving opening formed therein with said trim ring engaging said opaque plastic light transmitting barrier along said fin receiving opening, a cover mounted over said trim ring and having an opening therethrough aligned with said trim ring opening and engaging said opaque plastic light transmitting barrier along said opening, and a light transmitting indicator located in said fin and visible through said indicator window portion of said fin.

3. A composite knob including:

an injection molded translucent core having a skirt and an end wall, an indicator opening extending through at least one of said skirt and said end wall of said core, a light transmitting indicator positioned in said indicator opening and extending outwardly of said at least one of said skirt and said end wall, a disk mounted on said core and having an opening therein to fit over and receive said outwardly extension of said light transmitting indicator, a cover mounted on said disk and said core and having an opening therein fitting over and receiving said outwardly extension of said light transmitting indicator, and an opaque plastic light transmitting barrier positioned between said outwardly extending extension of said light transmitting indicator and said openings in said disk and said cover.

4. The composite knob of claim 3 in which said indicator opening is formed in said top wall of said core.

5. The composite knob of claim 3 in which said indicator opening is formed in said side wall of said core.

6. The composite knob of claim 3 in which said indicator opening is formed in said top and said side walls of said core.

7. The composite knob of claim 3 in which said light transmitting indicator is visible through said cover opening and said opaque plastic light transmitting barrier is positioned between said outwardly extending extension of said light transmitting indicator and said opening in said cover.

8. A composite knob, including:

an injection molded translucent core having a side wall and a top wall, an indicator window portion formed in at least one of said side and top walls of said core and projecting outwardly of said at least one of said walls, a trim ring positioned on said core and having an opening therethrough receiving said indicator window portion, a cover mounted on said trim ring and said core and having an opening therethrough aligned with said trim ring opening and receiving said indicator window portion, a light transmitting indicator located in said indicator window portion with its transmitted light visible through said trim ring opening, and an opaque plastic light transmitting barrier formed between said light transmitting indicator window portion and said opening in said trim ring.

9. The composite knob of claim 8 in which said indicator window portion is formed in said top wall of said core.

10. The composite knob of claim 8 in which said indicator window portion is formed in said side wall of said core.

11. The composite knob of claim 8 in which said indicator window portion is formed in said top and said side walls of said core.

12. The composite knob of claim 8 in which said light transmitting indicator is visible through said cover opening and said opaque plastic lighting barrier is formed between said light indicator window portion and said opening in said cover.

* * * * *